United States Patent [19]
Al-Temen et al.

[11] Patent Number: 5,857,832
[45] Date of Patent: Jan. 12, 1999

[54] RESTRAINT SEAT AND HOIST

[75] Inventors: Ihsan Al-Temen, Richmond Hill; Michael Doell, Scarborough; John Hancock, Oshawa; Stephen Ryan, Mississauga, all of Canada

[73] Assignee: Bloorview MacMillan Centre, Canada

[21] Appl. No.: 936,536

[22] Filed: Sep. 24, 1997

[51] Int. Cl.$^6$ ..................................................... B60P 9/00
[52] U.S. Cl. .......................... 414/921; 414/462; 280/727; 297/256.16
[58] Field of Search .............................. 280/727; 414/462, 414/921; 297/250.1, 253, 256.16; 5/81.1 R, 83.1, 85.1, 87.1, 84.1

[56] References Cited

U.S. PATENT DOCUMENTS

| | | |
|---|---|---|
| 2,650,725 | 9/1953 | Hoyer et al. . |
| 3,656,637 | 4/1972 | Lynn et al. . |
| 4,354,791 | 10/1982 | Antonellis ............................... 414/921 |
| 4,475,861 | 10/1984 | Melansky ................................ 414/462 |
| 4,483,653 | 11/1984 | Waite . |
| 4,544,321 | 10/1985 | Lanier . |
| 4,750,783 | 6/1988 | Irby et al. . |
| 4,861,105 | 8/1989 | Merten et al. . |
| 4,874,203 | 10/1989 | Henley . |
| 4,915,446 | 4/1990 | Darling et al. . |
| 4,928,330 | 5/1990 | Moore . |
| 5,018,933 | 5/1991 | Kramer . |
| 5,052,750 | 10/1991 | Takahashi et al. . |
| 5,385,386 | 1/1995 | Beamish et al. . |
| 5,460,472 | 10/1995 | Ber . |
| 5,540,539 | 7/1996 | Wolfman et al. . |

FOREIGN PATENT DOCUMENTS

| | | | |
|---|---|---|---|
| 3731708 | 4/1989 | Germany ............................... | 414/921 |

OTHER PUBLICATIONS http://www.bruno.com/wheelchairlifts.html, "Lifts Are Used in Many Different Applications, With Many Different Vehicles," Dec. 16, 1997, p. 3.
http://www.accessunlimited.com/multilift.html, "Multilift," Dec. 16, 1997, p. 5.

*Primary Examiner*—Christopher P. Ellis
*Attorney, Agent, or Firm*—Rothwell, Figg, Ernst & Kurz, p.c.

[57] ABSTRACT

The invention provides a restraint and transfer device for restraining a seated passenger, such as a child, for transport in a vehicle and for mechanically lifting the passenger in and out of the vehicle. A mounting frame is secured to a passenger seat of the vehicle with standard lap and shoulder seat belts. A cushioned transfer seat insert is used to seat the passenger in a suitably adapted wheelchair, during lifting in and out of the vehicle, and within the vehicle securely mounted to the frame. As a result, the passenger remains seated in a rigid supporting transfer seat insert. The passenger is not subjected to physical handling and the risk of injury to the caregiver and passenger is reduced during transfer. Releasable body postural positioning belts secure the passenger to the insert and the configuration of insert cushions, supports and postural belts can be flexibly adapted to suit the needs of each individual passenger. Mounting mechanisms on the frame and insert releasably mount and secure the insert to the frame. Restraint belts secure the passenger to the frame sufficiently to satisfy crash survival requirements. Suspension mechanisms attach to the lateral sides of the insert back and insert seat for suspending the insert and passenger seated therein from the vehicle roof top surface during lifting between a standby position outside the vehicle and a mounted position on the frame within the vehicle.

12 Claims, 14 Drawing Sheets

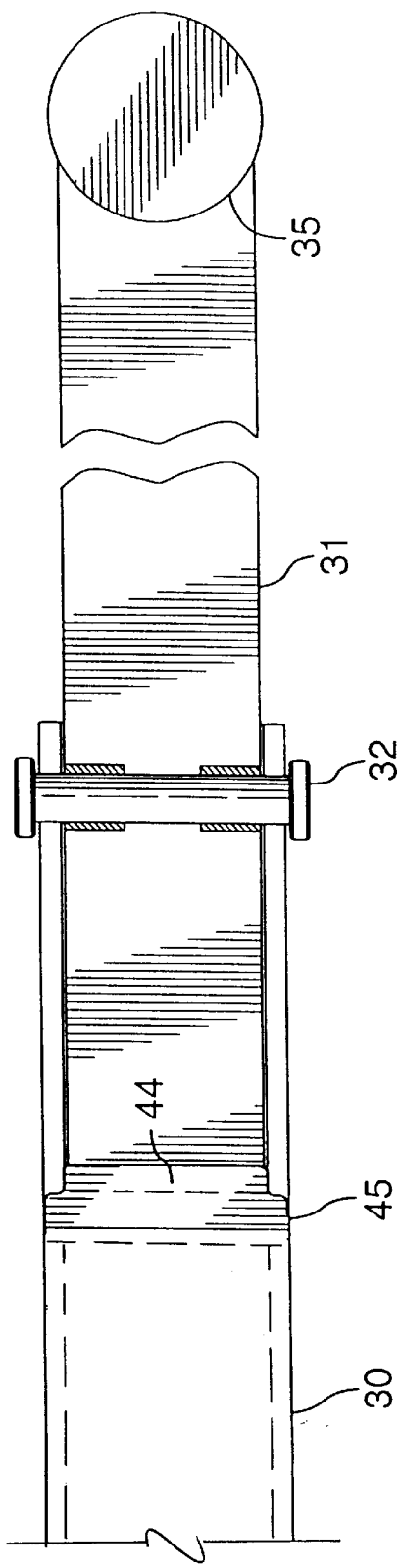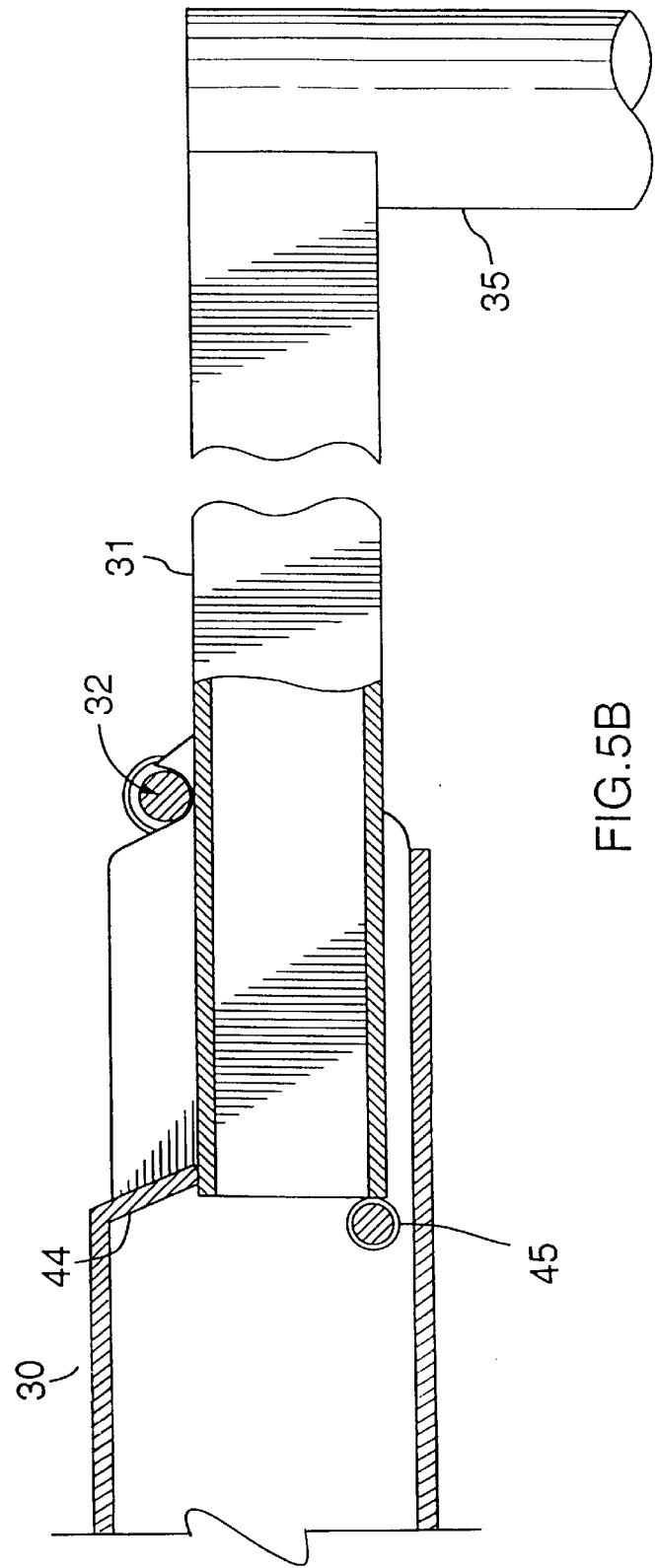

RESTRAINT SEAT AND HOIST

TECHNICAL FIELD

The invention is directed to a restraint and transfer device having a transfer seat and vehicle mounted frame for restraining a seated passenger during transport in a vehicle and including a roof mounted hoist for lifting the transfer seat and passenger seated thereon in and out of the vehicle.

BACKGROUND OF THE ART

There has long been recognized the need for a simple device to aid in the transferring movement of a wheelchair assisted passenger in and out of the passenger compartment of an automobile.

In the case of small children or infants, the child's weight may be low enough to enable a parent or caregiver to simply lift the small child between a wheelchair and a conventional child car seat. This stage in a child's life is generally quite short and as the child grows the caregiver may be subject to back injury due to the lifting and turning movements required.

In the case of adolescents and adults, such passengers may be physically able to enter the passenger compartment with some assistance, or may require the use of specially designed vans with wheelchair elevators. The physical capabilities, weight and size of adolescents and adults generally dictates the choice between use of a specially designed vehicle, or use of a conventional passenger car with the wheelchair passenger substantially assisting in movement between the wheelchair and passenger compartment.

The invention is directed to the need for a transfer device for use with a conventional roofed passenger vehicle which will allow passengers to be transferred from a wheelchair to the passenger compartment without subjecting the passenger to physical handling, and which substantially eliminates risk of injury to the passenger and caregiver.

Prior art responses to this need have been partially successful. However, widespread adoption of such devices has proved to be elusive. In practical terms the choice remains between manual handling of passengers and purchase of a relatively expensive specially designed wheelchair transport van.

U.S. Pat. No. 2,650,725 to Hoyer et al provides a roof mounted lift for transferring a wheelchair passenger into a car passenger compartment. The passenger is fitted with two slings around the back and knees and is lifted with a manually operated hydraulic lift.

The disadvantages of the Hoyer system are the positioning of a rigid lifting hook immediately in front of the passenger's face, which poses a safety risk especially with children and those with limited muscular control, and the use of slings which increases the labour and handling involved. Hoyer's lifting device is stored on the roof rack exposing it to vandalism, damage, weather, corrosion, and detracts visually from the car appearance. Hoyer's device is also heavy and since it is manually positioned and operated, the device is relatively difficult for caregivers to use.

Furthermore, Hoyer's device does not adequately address the postural support needs of individuals requiring specialized seating during the transfer and while being transported in a motor vehicle.

U.S. Pat. No. 5,540,539 to Wolfman et al provides a transfer chair that is lifted with a hydraulic elevator arm bolted to the body and door of a passenger car. The requirement of modifying the vehicle to install a relatively large structural element such as the lift arm involves significant cost and labour. Clearly, such a permanently installed device is not practical for use with rental cars, or when temporary use of a vehicle is required.

Several prior art devices include a frame mounted to a car seat, with a removable insert seat to eliminate the need to manually handle children when transferred between carriages or wheelchairs and a passenger vehicle. For example, such prior art includes U.S. Pat. Nos. 5,265,931 to Ryan, one of the present inventors; 5,385,386 to Beamish et al; 4,874,203 to Henley et al; and 4,750,783 to Irby et al. However none of these prior art devices include integral means to lift the passenger, but rather manual lifting is contemplated.

It is desirable therefore to produce a simple relatively inexpensive mechanical transfer device that can be used in association with a conventional roofed passenger vehicle. Preferably, the device is easily installed and removed with minimal disruption to the vehicle structure and minimal labour.

DISCLOSURE OF THE INVENTION

The invention provides a novel restraint and transfer device for restraining a seated passenger, such as a child, for transport in a vehicle and for mechanically lifting the passenger in and out of the vehicle.

A mounting frame is secured to a passenger seat of the vehicle with standard lap and shoulder seat belts. An individualized cushioned transfer seat insert is used to seat the passenger in a suitably adapted wheelchair, during lifting in and out of the vehicle, and within the vehicle securely mounted to the frame.

As a result, the passenger remains seated in a rigid supporting transfer seat insert. The use of such seating support is particularly important for passengers who require rigid support for comfort, function, pressure sore prevention and/or for management of pathological reflexes. The passenger seated in the rigid insert is not subjected to physical handling. The risk of injury to the caregiver and passenger is also reduced during transfer.

Releasable body positioning postural belts secure the passenger to the insert and the configuration of insert cushions, supports and postural belts can be flexibly adapted to suit the needs of each individual passenger. Mounting mechanisms on the frame and insert releasably mount and secure the insert to the frame. Shoulder and lap restraint belts releasably secure the child passenger to the frame sufficiently to satisfy crash survival requirements. Similar universal mounting mechanisms can also be provided on the wheelchair used in transferring the passenger.

Therefore, the seat insert includes postural belts to secure the passenger to the rigid insert in a comfortable appropriate posture depending on their specific individual needs. The frame has restraint belts which overlap the passenger and seat insert to ensure safety during travel in the motor vehicle. Both the postural and restraint belts remain attached during such travel.

Suspension mechanisms attach to the lateral sides of the insert back and insert seat for suspending the insert and passenger seated therein from the vehicle roof top surface during lifting between a standby position outside the vehicle and a mounted position on the frame within the vehicle. Preferably the lifting mechanism comprises an electric hoist with a lift harness and a roof top carrier. The hoist is mounted to the roof top carrier with a quickly disengaged bayonet mount and includes a swivel for swinging the lift harness between the standby and mounted positions. The lift harness includes a horizontal spreader bar and four adjustable length straps with clasps to releasably connect to D-rings on the seat insert.

In use, the hoist and lift harness are quickly mounted and dismounted from the roof top carrier and stored in the vehicle trunk with the folded wheelchair. Twelve-volt electric power is provided to the hoist with a cigarette lighter jack. The frame and roof top carrier are easily installed and removed enabling caregivers to quickly adapt any common roofed vehicle to carry wheelchair assisted passengers.

The invention therefore provides a detachable transfer seat insert with postural belts and integral lifting rings, a car seat mounted frame with restraint belt, a lightweight roof mounted electric hoist powered by the car battery and able to swivel the lifting harness in and out of the passenger compartment, a safe lifting harness and lift tackle.

All components are easily assembled and removable without special tools or significant labour, or modification of the passenger vehicle. In particular, the hoist and lift harness can be quickly dismounted from the roof rack and stored with the folded wheelchair in the car trunk. The roof rack does not require permanent change to the vehicle, and electric power to eliminate manual work is readily available from the cigarette lighter of conventional vehicles.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein:

FIGS. 5A and 5B are plan and sectional elevation views respectively of the interacting bayonet receptacle of the car top carrier and bayonet mount of the hoist;

FIGS. 11, 12 and 13 are sectional elevation views of the insert and frame that show the progressive movement of the insert suspended from the hoist as it is moved into engagement with the mounting frame, wherein;

FIG. 11 shows the insert suspended above the frame and in phantom outline shows the initial engagement position;

FIG. 12 shows the initial engagement wherein the underside of the insert seat includes a transverse mount bar which slides into engagement with a hook on the frame, thereby providing a pivot to rotate the insert counterclockwise, as a second transverse bar in the insert seat back slides over a spring loaded cam faced dog in the frame back; and FIG. 13 shows the insert fully engaged and secured to the frame wherein the spring-loaded dog in the frame back secures the transverse dog in the insert back.

DETAILED DESCRIPTION OF PREFERRED EMBODIMENTS

With reference to FIGS. 1–4, the invention provides a restraint and transfer device that restrains a seated passenger for transport in a vehicle seat. The vehicle shown is a conventional passenger car with associated seat belts and roof top surface. The device provides mechanical lifting of the passenger in and out of the passenger vehicle. It will be understood that a child is illustrated as the likely passenger in the accompanying drawings, however, the invention in its broad conception includes embodiments adapted for lifting adults.

Figure 8:
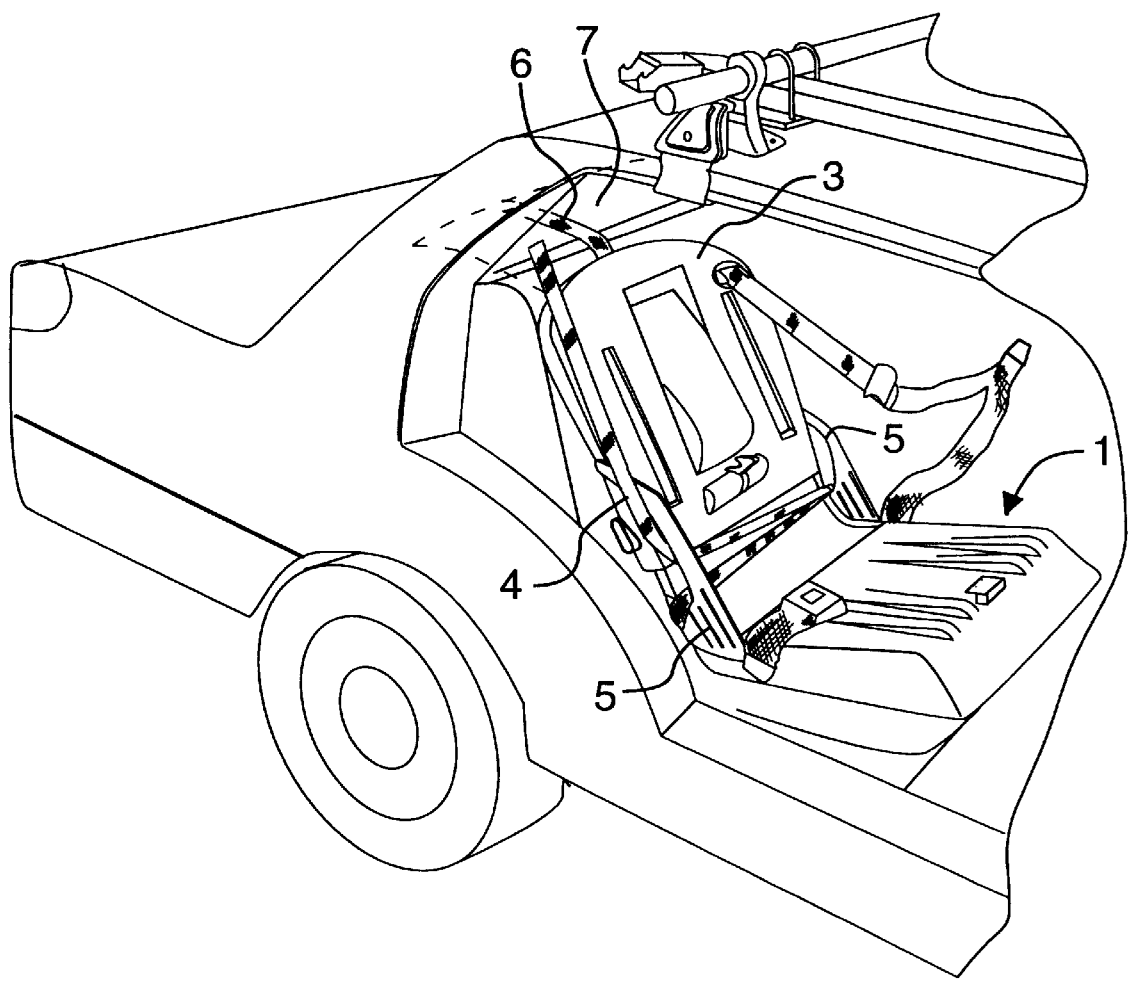
FIG. 8 is a perspective view of the mounting frame secured to the passenger seat of the vehicle with conventional lap and shoulder seat belts through openings in the middle area of the frame.

Referring to FIG. 8, the mounting frame 1 has a frame seat 2 and a frame back 3, and is positioned on top of the cushioned passenger seat of a car. It is not necessary to modify the vehicle seat in any way since the frame is merely placed on top and is secured in place with the lap-shoulder seat belt 4 that is standard equipment for most cars.

The frame 1 is preferably constructed of metal tubing with molded plastic seat 2 and back 3 panels attached to the metal tubing. A side gusset plate 5 reinforces the seat 2 to back 3 connection and includes an opening through which the clasp and vehicle's seat belt 4 is threaded. A tether strap 6 extends from the top of the frame back 3 and is secured with a releasable clasp to a bolt installed in the rear dashboard 7 as is conventional for a child car seat. Thus the frame 1 is securely held on the passenger seat of a vehicle without requiring any substantial modification to the vehicle.

Figure 9:
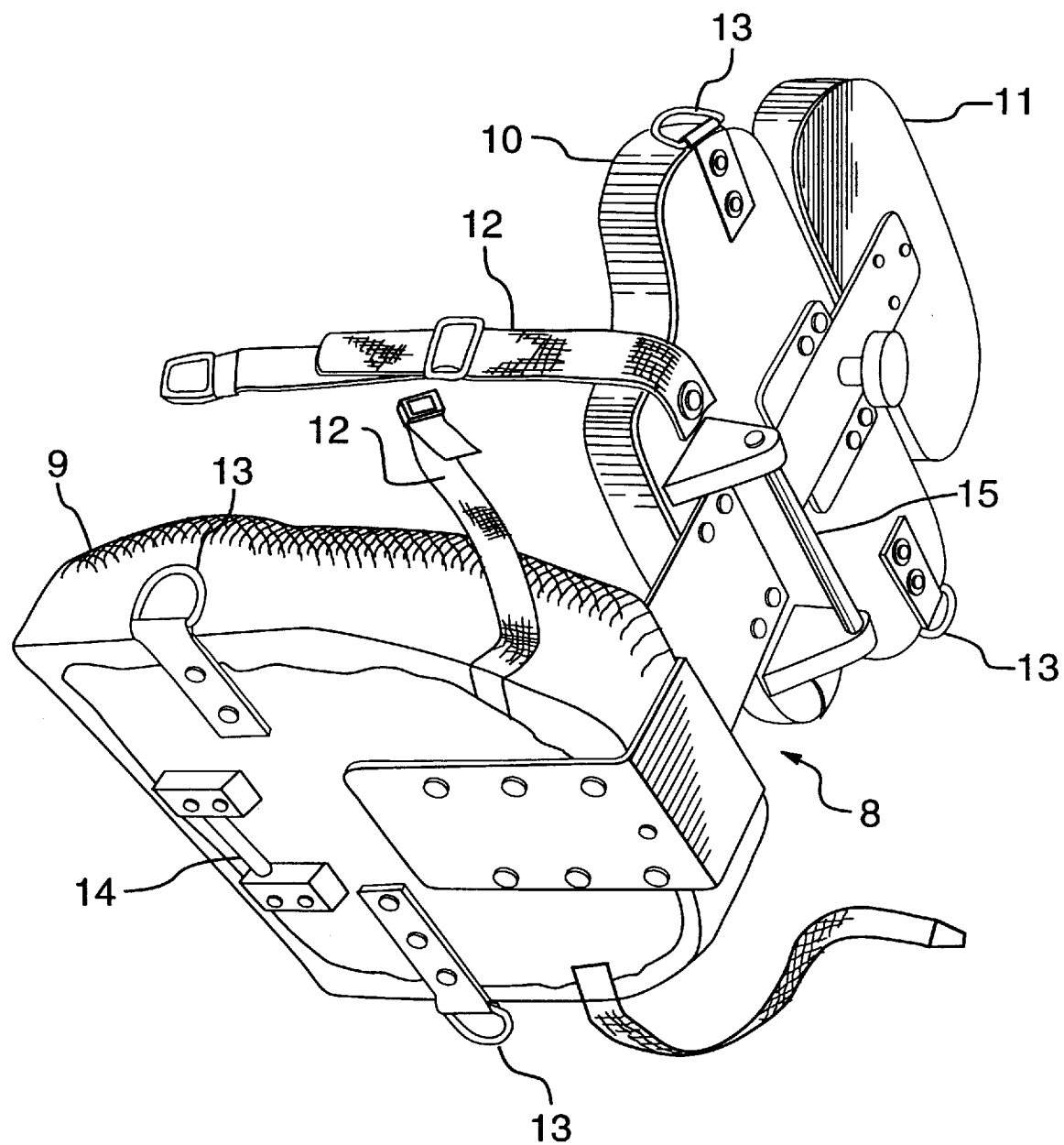
FIG. 9 is a perspective view of the transfer seat insert seat bottom and back illustrating the seat and back cushions with postural belts and adjustable head rest, four lifting D-rings, and mounting rods on the seat bottom and back for interlocking with mating hooks and latches on the frame to secure the insert and frame together.
Figure 10:
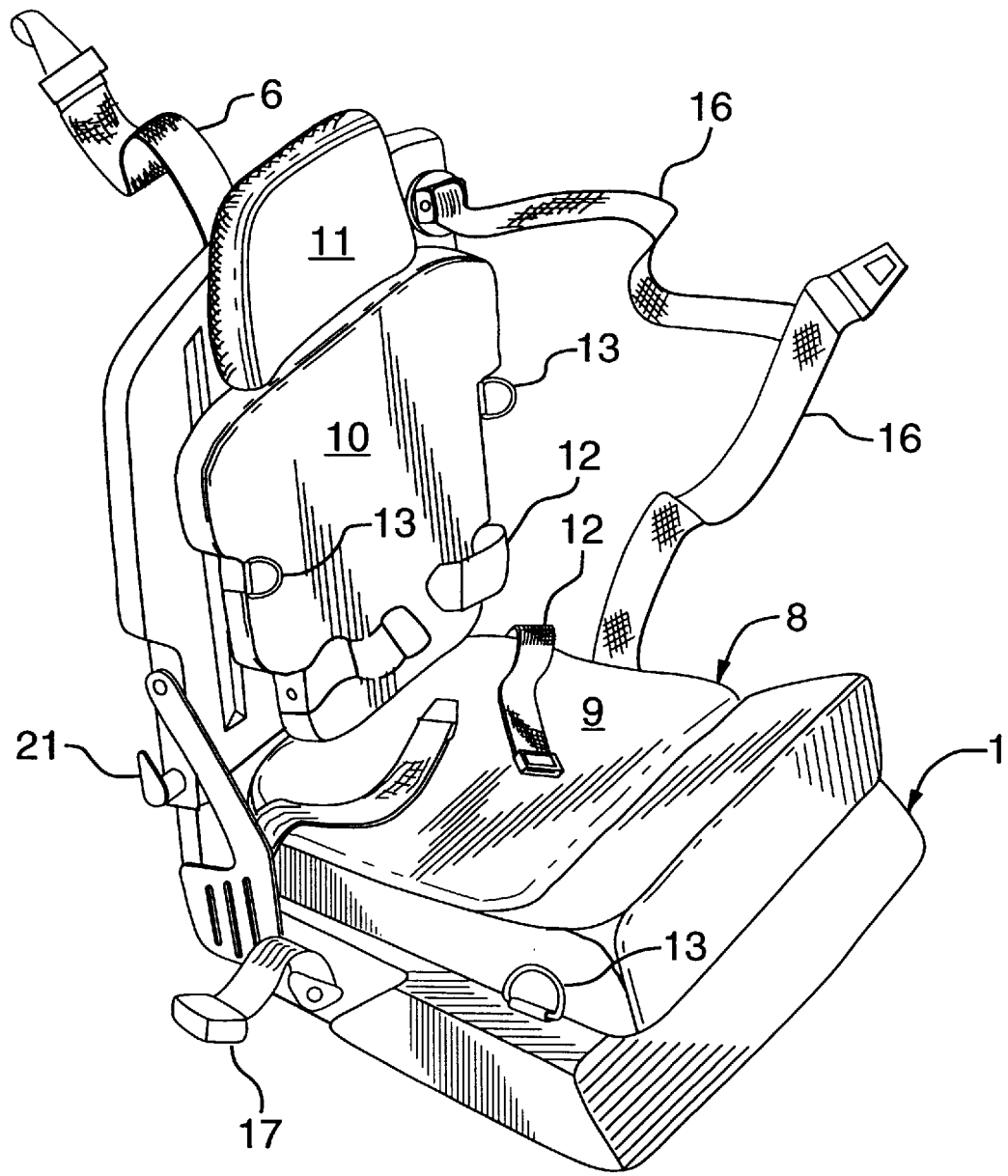
FIG. 10 is a perspective view of the transfer seat insert mounted in the frame and illustrating the tether strap extending from the top frame back, the postural belts of the insert, and the additional three point lap-shoulder restraint belt secured to the frame which secures the passenger to the frame.

Referring to FIGS. 9 and 10, the device also includes a transfer seat insert 8, having a cushioned insert seat 9, cushioned back 10, and adjustable headrest 11. The insert 8 can be modified to suit the particular needs of any passenger. For example, arm rests or specially contoured cushions may be desired depending on the passenger's need, together with various releasable postural belts.

In the illustrations, postural belts 12 are shown merely as an example, however, those skilled in the art will recognize that pelvic, or arm rest supports and other postural belts, for example, can be easily incorporated into the insert shown. Therefore a strength of the device is the capability of modifying the seat insert for various needs, while maintaining the remainder of the device in standard production format.

Figure 4:
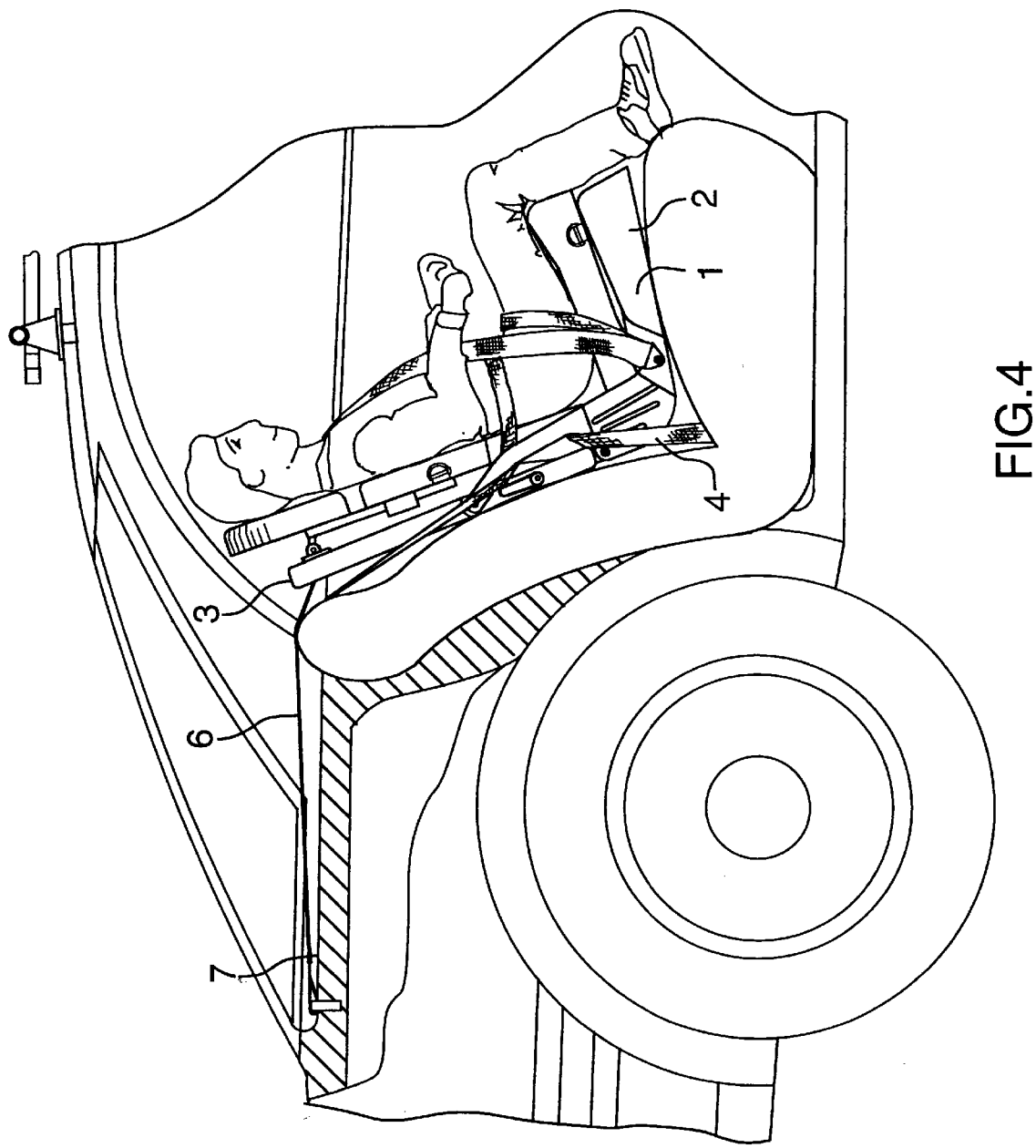
FIG. 4 is a partially sectional view of the completely assembled mounting frame and transfer seat insert with child passenger secured with postural belts to the insert and in addition secured to the frame with a separate three point lap-shoulder restraint belt.

Extending from the lateral sides of the transfer seat insert 8 are releasable connectors such as D-rings 13 to provide removable means for suspending the insert 8 and passenger seated thereon from the vehicle roof top surface during lifting (as illustrated in FIGS. 1–4) between a standby position outside the vehicle (as in FIG. 1) to a mounted position within the vehicle (as in FIG. 4).

As described in detail below, mounting means are provided on the frame 1 and insert 8 for releasably mounting and securing the insert 8 to the frame 1. As best seen in FIG. 9, the bottom surface of the seat insert 9 includes a seat mount bar 14, and the rear surface of the insert back 10 includes a back mount bar 15. When fully engaged, the mount bars 14, 15 accurately locate and secure the insert 8 to the frame 1 as indicated in FIG. 10. A three point lap-shoulder restraint belt 16 and mating buckle 17 extend from the frame 1 to secure the passenger to the frame 1 and vehicle.

Figure 11:
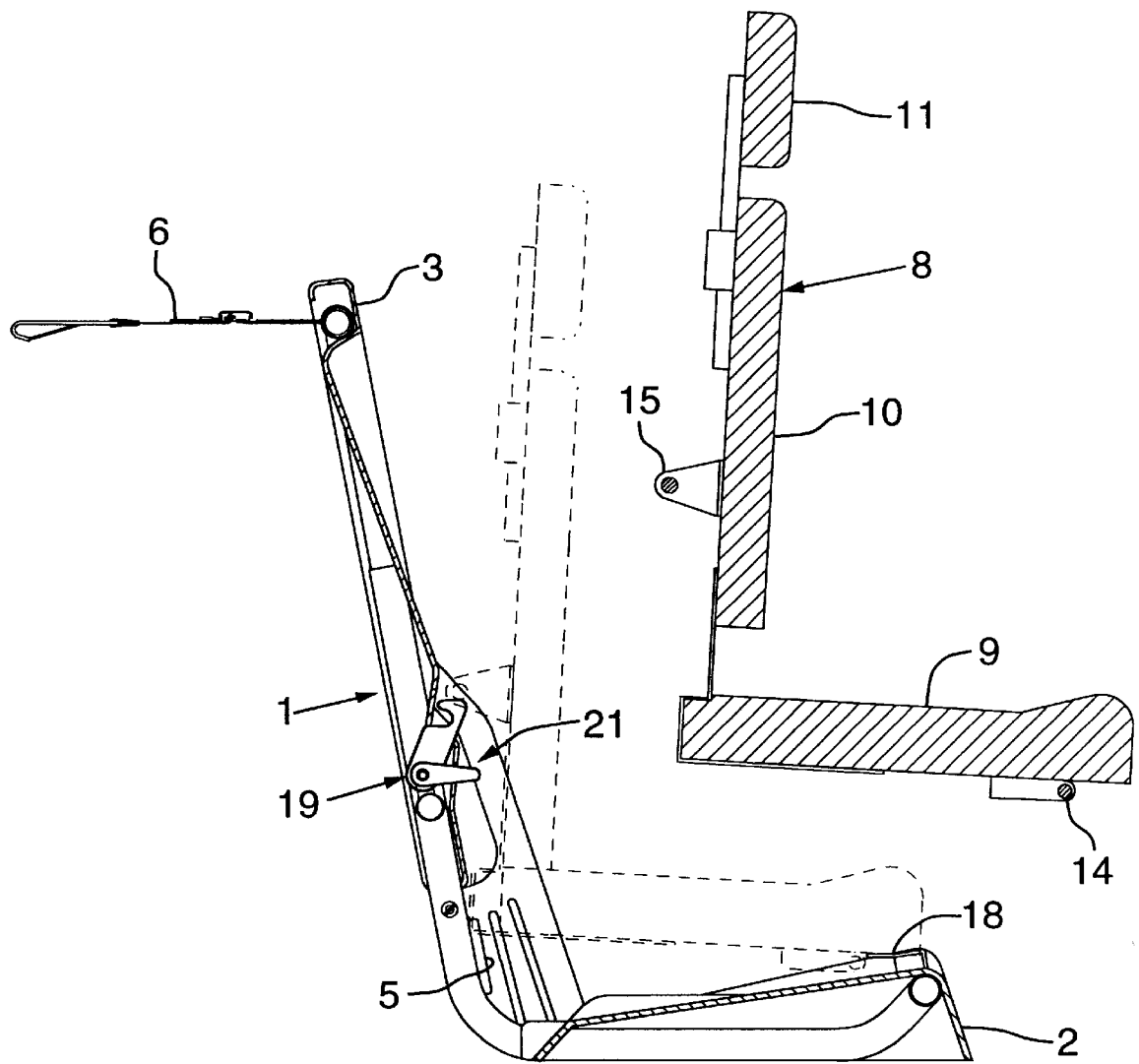
Figure 12:
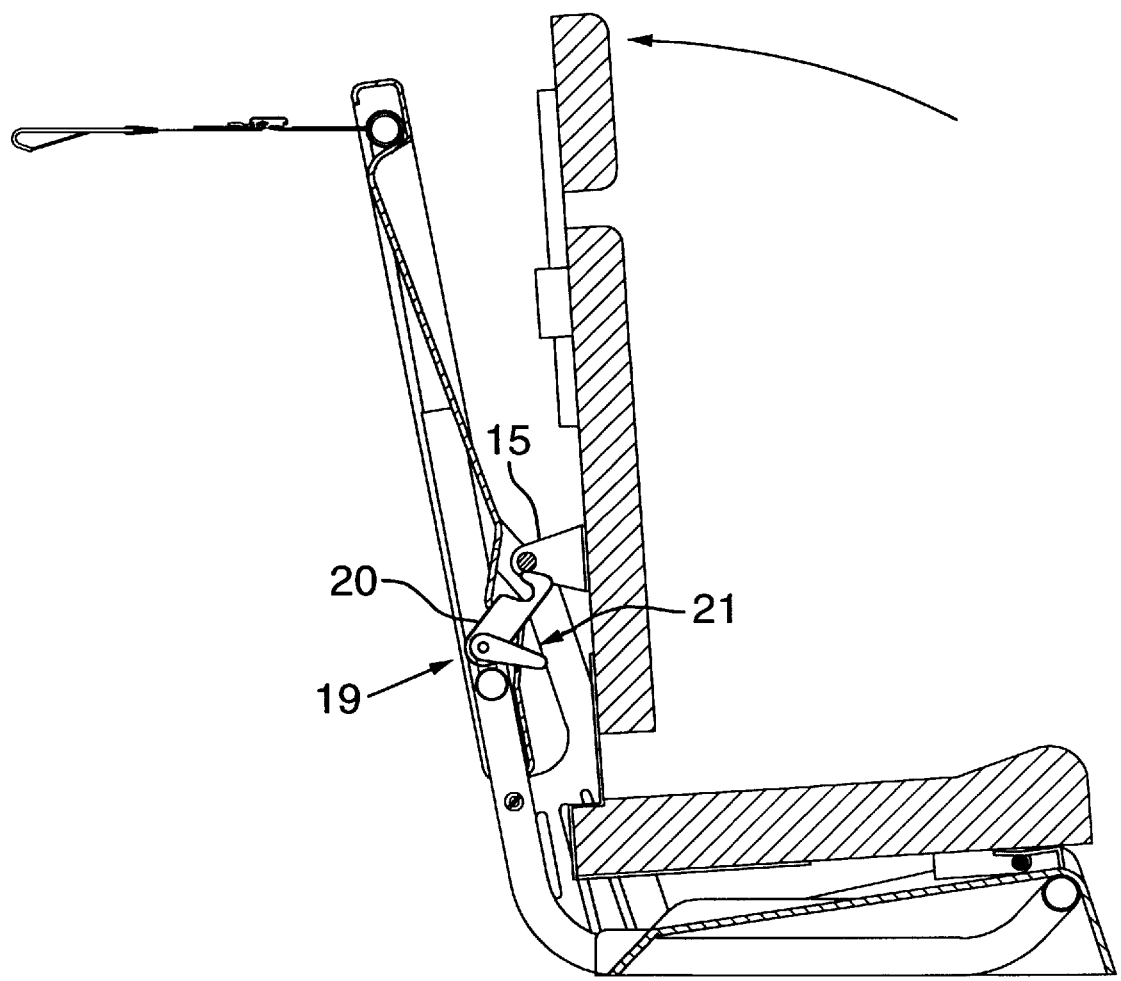
Figure 13:
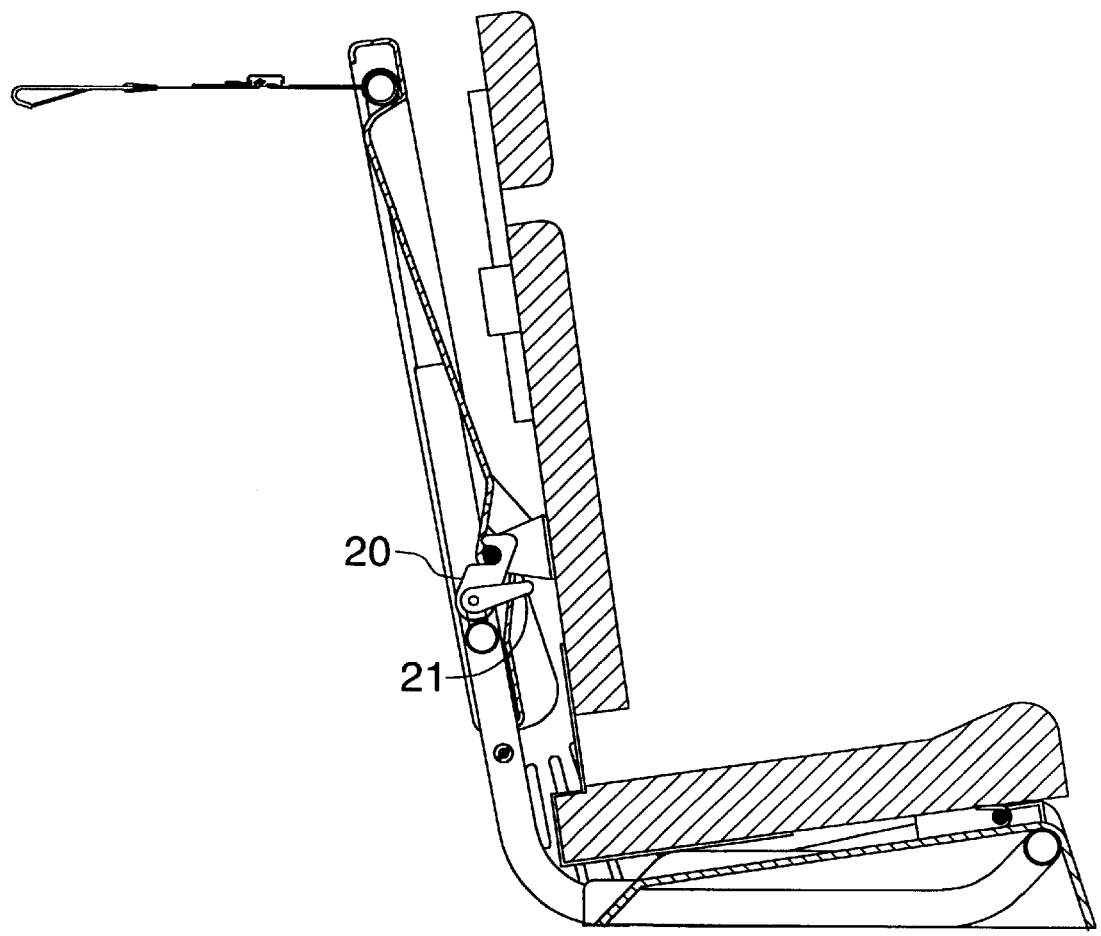

Referring to FIGS. 11, 12 and 13, the drawings show the progressive movement of the insert 8, when suspended from the hoist, as it is moved into engagement with the mounting frame 1. The frame seat 2 includes a rearwardly open hook 18 which engages the seat mount bar 14. When engaged in the hook 18, the seat mount bar 14 provides a pivot for rotating the insert, counterclockwise as drawn, into engagement with a latch 19.

As shown in FIG. 12, when the insert 8 is rotated, the back mount bar 15 engages the cam face of a spring loaded dog 20. Further rotation snap locks the dog 20 and rear bar 15 into secure engagement as shown in FIG. 13. The dog 20 is held in place with spring bias and is manually released for removal with a laterally extending release lever 21.

Figure 1:
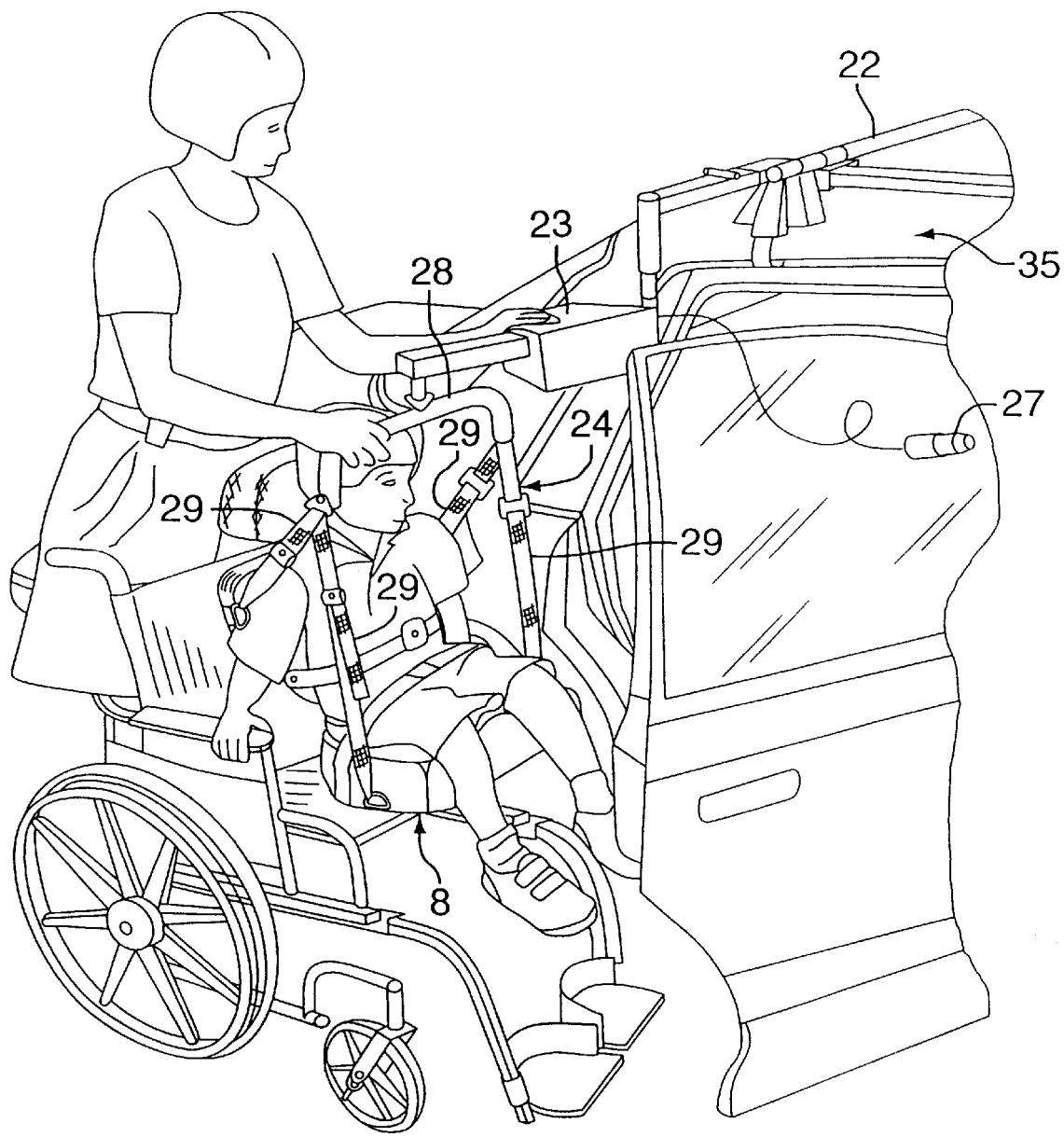
FIG. 1 is a perspective view of the invention in use wherein the seated child passenger is suspended from the hoist with a lifting harness releasably secured to the removable transfer seat insert, and is lifted from a wheelchair in a standby position adjacent the rear door of a conventional passenger sedan equipped with a roof mounted car top carrier that supports the hoist on a quick release bayonet mount.
Figure 2:
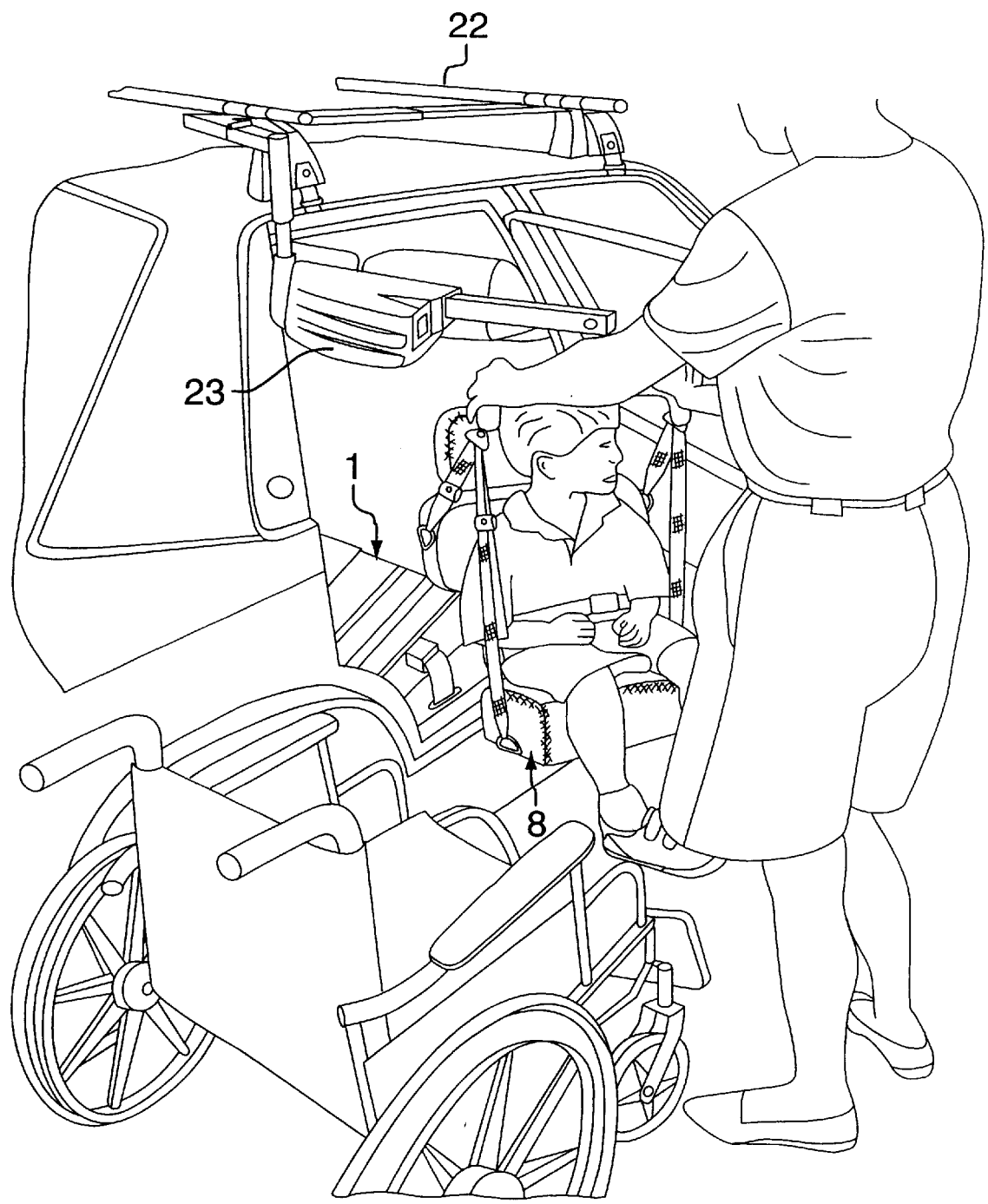
FIG. 2 is a like perspective view showing the positioning of the child passenger to enter or exit the car door suspended from the hoist, with the hoist swiveling forwardly and the child's back facing the car door opening.
Figure 3:
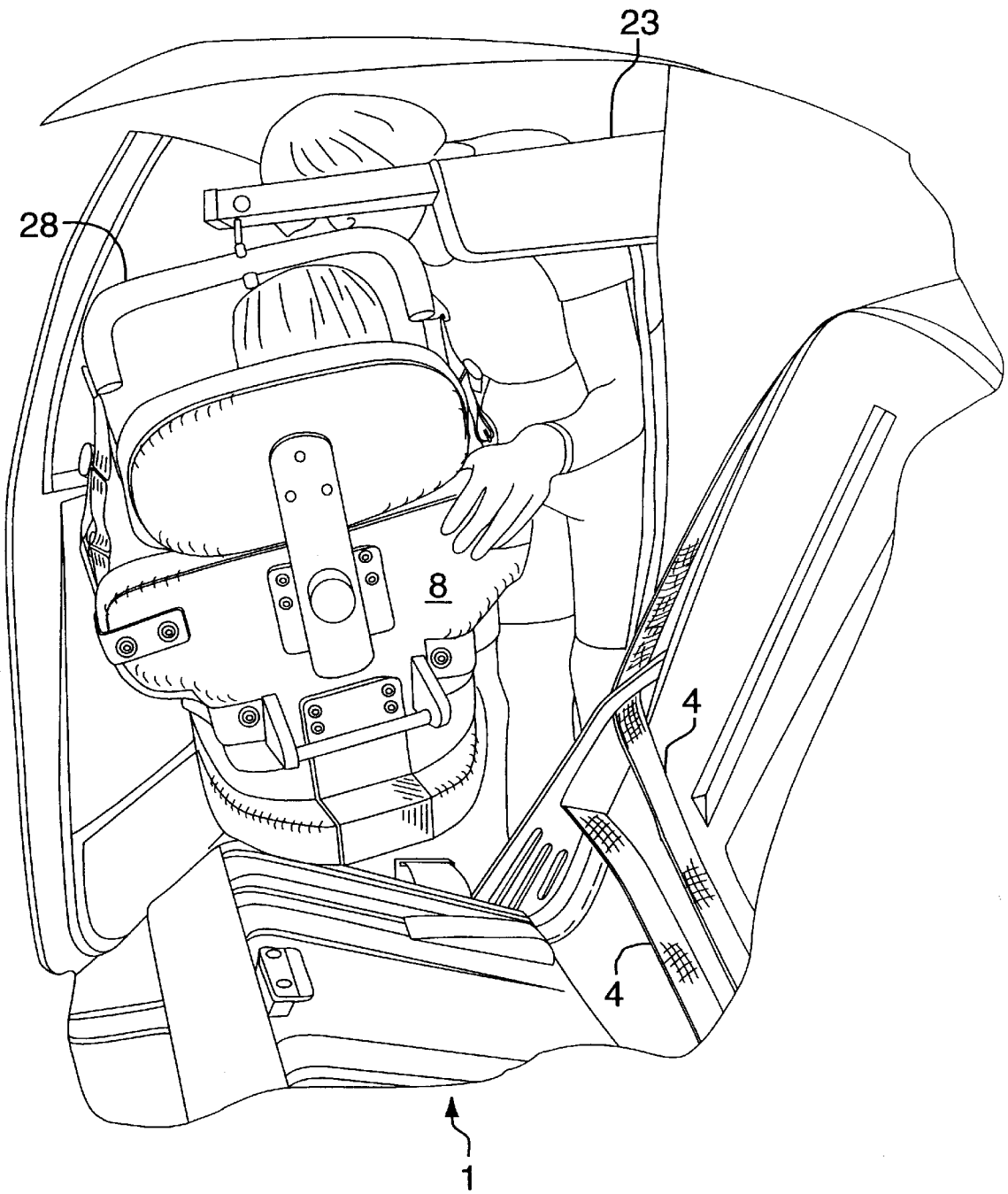
FIG. 3 shows a further progression from the car interior perspective indicating the mounting means on the insert back and, as drawn to the right, showing the outline of the mounting frame secured to the car passenger seat with conventional passenger shoulder and lap seat belts.

Turning to FIG. 1, the device includes a rooftop carrier 22 and an electric hoist 23 with a lift harness 24. The hoist 23 is releasably secured to the carrier 22 and supported by the vehicle roof 25 only. No other support is necessary and therefore no modification of the vehicle is required.

The electric hoist 23 includes a removable cigarette lighter jack 27 as an interface to provide electric power from the car battery. If desired, a permanent electrical receptacle can be easily provided in the rear dashboard 7, or other convenient location.

As shown in FIG. 1, the lift harness 24 preferably includes a spreader bar 28 centrally suspended from the hoist 23. The spreader bar 28 has two ends with two adjustable length straps 29. At the ends of each of the four straps 29 is a clasp to engage the D-rings 13 of the transfer seat insert 8. The length of the straps 29 can be custom adjusted to suit the desired height and orientation of a wide variety of passengers.

Figure 5:
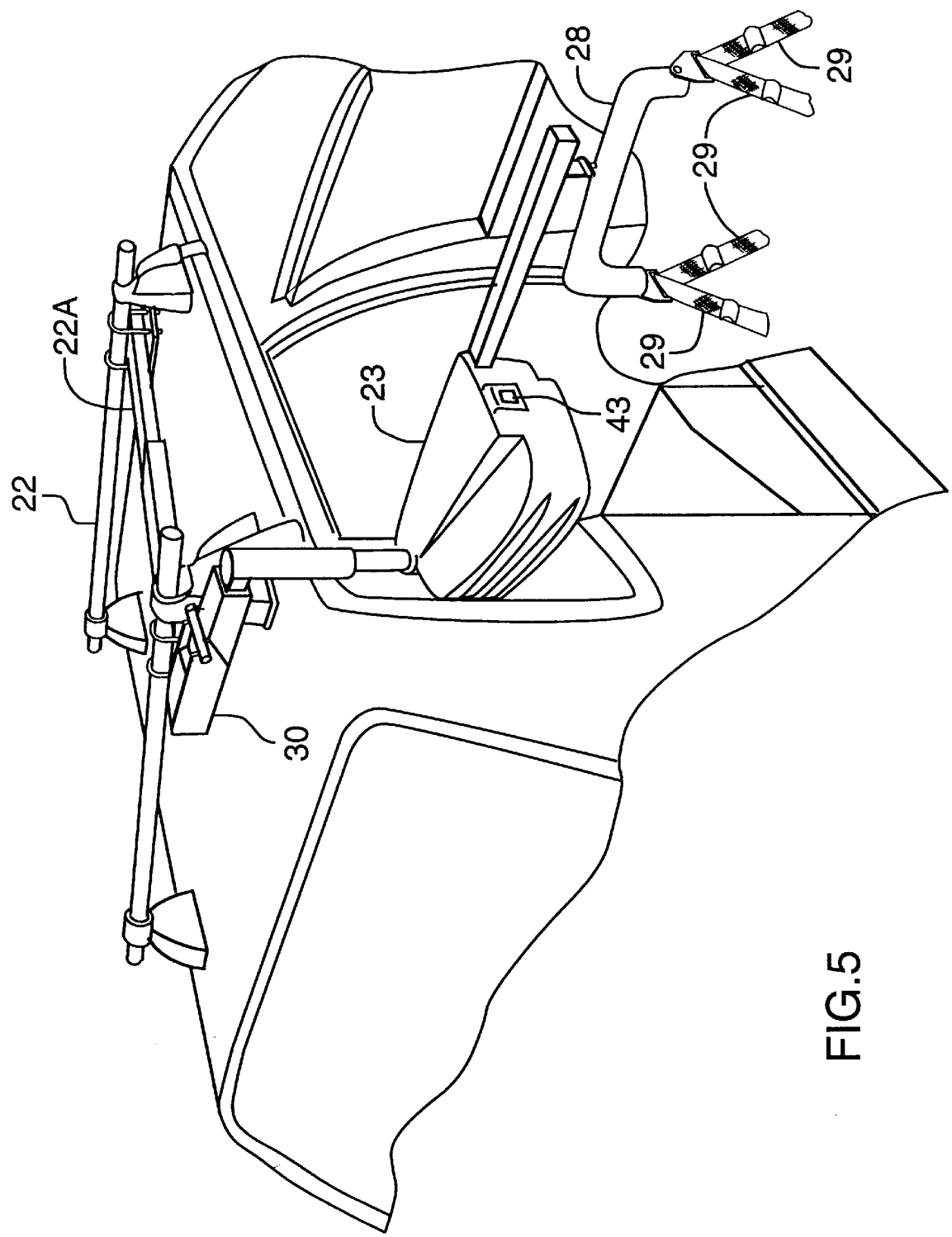
FIG. 5 is a perspective view of the roof top carrier adapted to provide a rearwardly extending bayonet mount receptacle, hoist with swivel and bayonet mount, and lifting harness.
Figure 6:
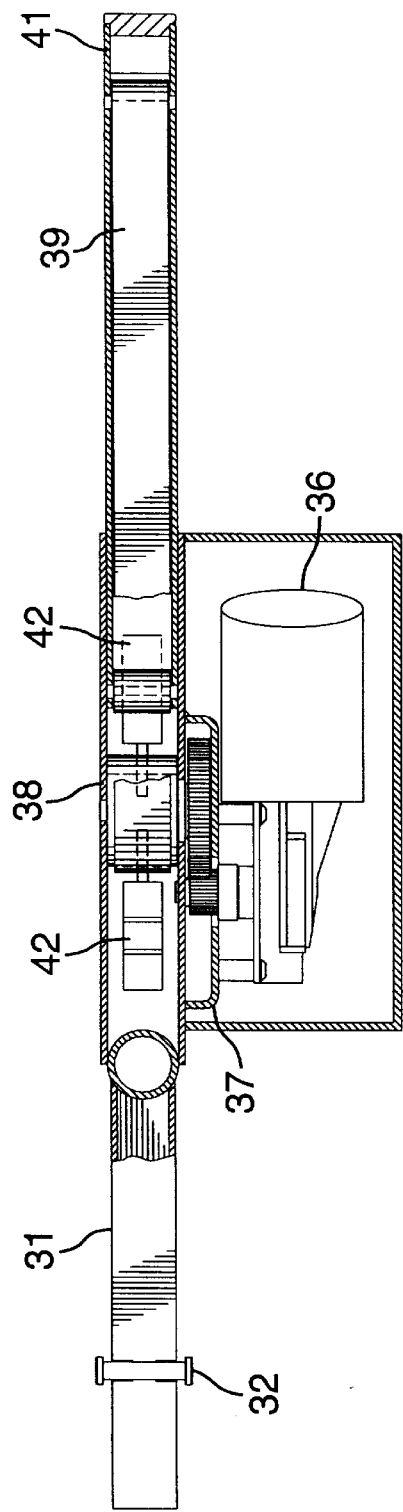
FIGS. 6, 6A and 7 are respectively a top plan view, side elevation view, and sectional elevation view of the hoist and suspension assembly with: bayonet mount (as drawn progressing from the left to right); swivel joint; hoist motor-reducer-reel assembly; hollow tube extension with internal pulleys; and lifting harness.
Figure 6A:
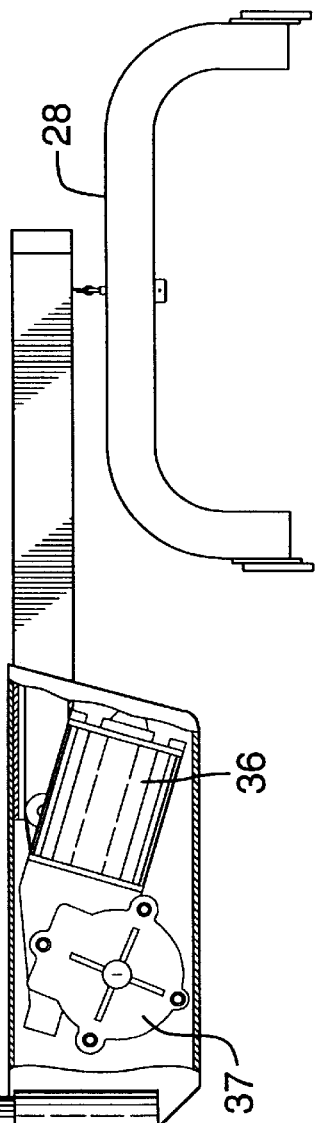
Figure 7:
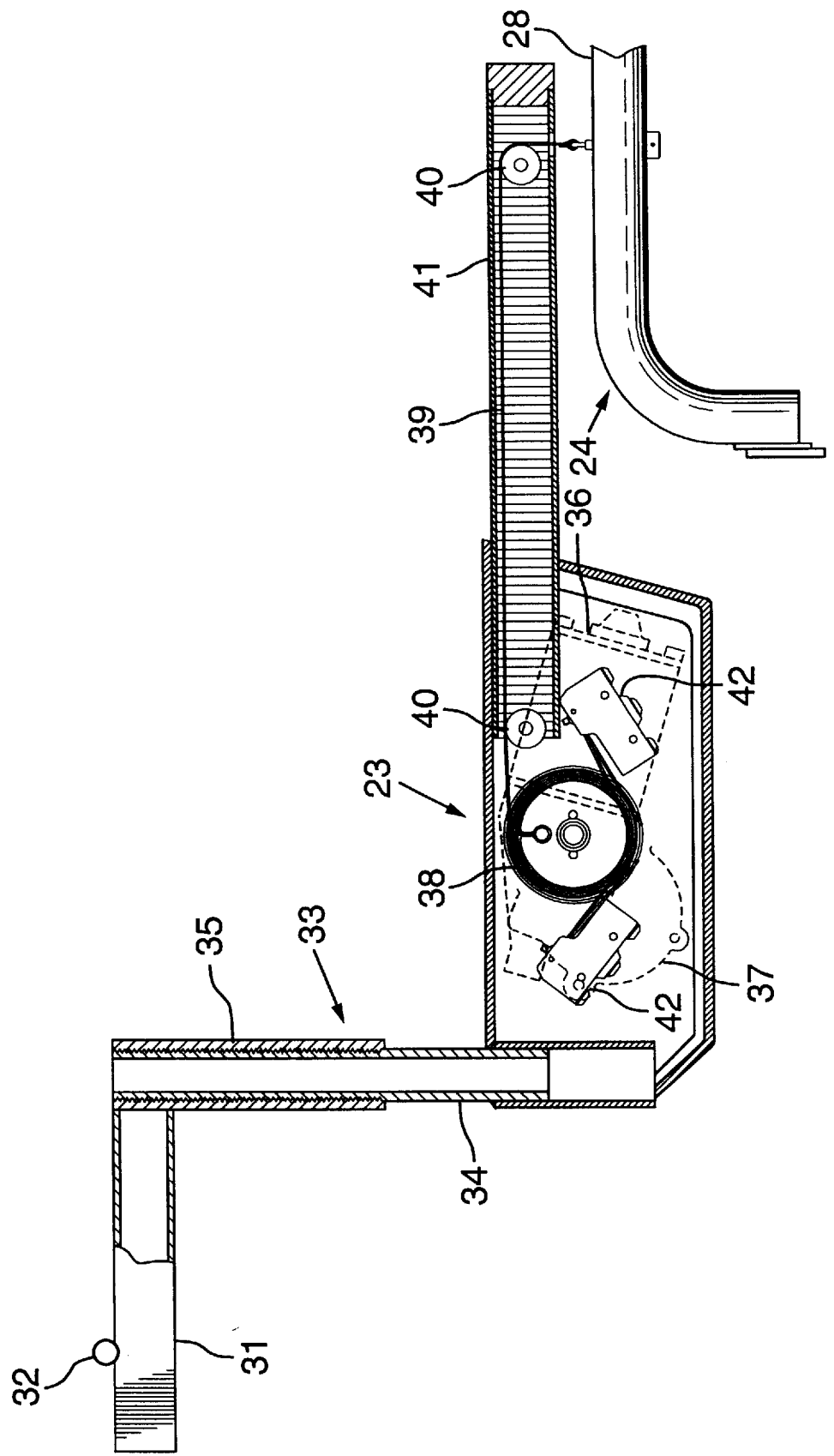

FIG. 5 shows a more detailed view of the roof rack 22, hoist 23, spreader bar 28 and straps 29 in lifting position. The roof rack 22 is a standard mass-produced device, comprising a pair of transverse rails 22 supported on four legs with associated straps to secure the rails to the car roof. The roof rack 22 has been modified to include a telescoping hollow square tube 22A that has an adjustable length and extends between the transverse rails 22 of the roof rack 22. The tube 22A is underhung from the rails 22 with U-bolts to provide ease of installation. The tube 22A also includes an extension 30 extending rear of the passenger door at an angle, providing a bayonet mount receptacle 30 for receiving a mating square tube 31 of the hoist 23.

Referring to detail views FIGS. 5A and 5B, the extension 30 has a partially open top and side recesses to receive a bayonet mount tube 31 of the hoist 23 and a supporting transverse rod 32. As seen in FIGS. 5, 5A, 5B, 6 and 7, the hoist 23 is releasably supported in the receptacle tube 30 of the roof rack 22 by inserting a smaller horizontal square tube 31. The transverse rod 32 rests in mating recesses in the receptacle tube 30 to locate and secure the hoist mounting tube 31. The receptacle tube 30 includes a transverse plate 44 to support the cantilevering hoist tube 31, and a transverse pin 45 to abut, support and position the inboard end of the hoist tube 31.

A swivel joint 33 is provided for swinging the lift harness 24. As drawn the swivel joint comprises a threaded bolt 34 within a sleeve 35. The threaded end of the bolt 34 allows for adjusting the vertical positioning of the hoist 23 relative to the carrier 22.

The hoist 23 includes an electric motor 36 and reducer 37 that drive a reel 38. The reel 38 is wound with a flat fabric strip 39 that extends over internal rollers 40 inside a hollow tube jib extension 41. Limit switches 42 provide electric means for limiting the upper and lower extent of the hoist 23. A reversible spring-loaded switch 43 (seen best in FIG. 5) allows the user to operate the lifting hoist 23 with one hand, while using their other hand to guide and stabilize the passenger being lifted. Therefore the device provides a simple lightweight hoist 23 which is readily adapted to any car roof mounting with a simple roof rack 22.

A woven fabric strip or belt 39 is preferred, although any type of tensile cable can be used, since it is relatively simple for average users to inspect for damage and will not scratch or injure children when frayed unlike steel cables for example.

Although the above description and accompanying drawings relate to specific preferred embodiments as presently contemplated by the inventor, it will be understood that the invention in its broad aspect includes mechanical and functional equivalents of the elements described and illustrated.

We claim:

1. A restraint and transfer device for restraining a seated passenger for transport in a vehicle having a vehicle seat with associated seat belts and a vehicle roof top surface, and for mechanically lifting the passenger in and out of the vehicle, the device comprising:

a mounting frame, having a frame seat and frame back, and having means for securing the frame with said seat belts to said vehicle seat, and having restraint means for restraining the passenger to the frame;

a transfer seat insert, having an insert seat and insert back with lateral sides, including a plurality of cushions, and releasable body postural positioning belt means for securing the seated passenger to the insert;

mounting means, on the frame and insert, for releasably mounting and securing the insert to the frame; and suspension means, on the lateral sides of the insert back and insert seat, for suspending the insert and passenger seated therein from the vehicle roof top surface during lifting.

2. A device according to claim 1 wherein the suspension means comprise removable lifting means for lifting the insert and passenger seated thereon between a standby position outside the vehicle and a mounted position on the frame within the vehicle.

3. A device according to claim 2 wherein the lifting means comprises an electric hoist with a transfer seat insert lift harness and means for securing the hoist to the vehicle roof top surface.

4. A device according to claim 3 wherein the means for securing the hoist include:

a roof top carrier; and hoist mount including bayonet mount means for releasably mounting the hoist to the carrier, and including swivel means for swinging the lift harness between the standby and mounted positions.

5. A device according to claim 4 wherein the hoist mount includes means for adjusting vertical positioning of the hoist relative to the carrier.

6. A device according to claim 3 wherein the hoist includes removable electrical interface means for providing electric power from the vehicle.

7. A device according to claim 3 wherein the suspension means include releasable connector means attached to each side of the insert seat and insert back.

8. A device according to claim 7 wherein the lift harness comprises:

a spreader bar centrally suspended from the hoist, the bar having two ends each with two adjustable length straps with clasp means for engaging the connector means.

9. A device according to claim 3 wherein the hoist includes a reel of cable, and limit switch means for limiting the upper and lower extent of the hoist.

10. A device according to claim 9 wherein the cable comprises a flat fabric strip.

11. A device according to claim 1 wherein the mounting means comprise a mating hook and mount bar disposed on mating surfaces of the insert and frame, the mount bar comprising pivot means for rotating the insert into engagement with latch means disposed on mating surfaces of the insert and frame for releasably securing the insert to the frame.

12. A device according to claim 1 wherein the latch comprises a spring loaded cam faced dog, and an associated laterally extending release lever.

* * * * *